US010248185B2

(12) United States Patent
Okazawa et al.

(10) Patent No.: US 10,248,185 B2
(45) Date of Patent: Apr. 2, 2019

(54) INFORMATION PROCESSING APPARATUS CONTROL METHOD OF INFORMATION PROCESSING APPARATUS AND STORAGE MEDIUM

(71) Applicant: CANON KABUSHIKI KAISHA, Tokyo (JP)

(72) Inventors: Takashi Okazawa, Tokyo (JP); Tomohiro Kimura, Matsudo (JP)

(73) Assignee: Canon Kabushiki Kaisha, Tokyo (JP)

( * ) Notice: Subject to any disclaimer, the term of this patent is extended or adjusted under 35 U.S.C. 154(b) by 2 days.

(21) Appl. No.: 15/402,938

(22) Filed: Jan. 10, 2017

(65) Prior Publication Data

US 2017/0149991 A1 May 25, 2017

Related U.S. Application Data

(63) Continuation of application No. 14/097,824, filed on Dec. 5, 2013, now Pat. No. 9,575,546.

(30) Foreign Application Priority Data

Dec. 6, 2012 (JP) .................................. 2012-267558

(51) Int. Cl.
*G06F 1/32* (2006.01)
*G06F 1/3293* (2019.01)
*G06F 1/3209* (2019.01)
*G06F 1/3234* (2019.01)
*G06K 15/00* (2006.01)
(Continued)

(52) U.S. Cl.
CPC .......... *G06F 1/3293* (2013.01); *G06F 1/3209* (2013.01); *G06F 1/3284* (2013.01); *G06F 1/3287* (2013.01); *G06K 15/4055* (2013.01); *H04N 1/00896* (2013.01); *H04N 1/32032* (2013.01); *G06K 15/1803* (2013.01); *H04L 61/103* (2013.01); *H04N 2201/0091* (2013.01); (Continued)

(58) Field of Classification Search
CPC .... G06F 1/3209; G06F 1/3287; G06F 1/3284; G06F 1/3293; H04N 1/00896
USPC ........................................................ 713/323
See application file for complete search history.

(56) References Cited

U.S. PATENT DOCUMENTS 5,982,505 A   11/1999  Jeon
6,085,328 A    7/2000  Klein
(Continued)

FOREIGN PATENT DOCUMENTS

CN          102780622 A       11/2012

OTHER PUBLICATIONS

"CS 457—Lecture 21 More TCP", 2011, Colostate, p. 6, 9, 17-26.*

*Primary Examiner* — Robert E Fennema
*Assistant Examiner* — Santosh R Poudel
(74) *Attorney, Agent, or Firm* — Canon U.S.A., Inc. IP Division

(57) ABSTRACT

Whether to enable a packet discarding mode is designated and, if an information processing apparatus operates in a power saving mode and the packet discarding mode is enabled, the information processing apparatus determines processing for a received packet based on a proxy response pattern, a WOL pattern, and a discard pattern, and, if the information processing apparatus operates in the power saving mode and the packet discarding mode is disabled, the information processing apparatus determines processing for the received packet based on the proxy response pattern and the WOL pattern without using the discard pattern.

13 Claims, 8 Drawing Sheets

(51) Int. Cl.
  *H04N 1/00* (2006.01)
  *G06F 1/3287* (2019.01)
  *H04N 1/32* (2006.01)
  *G06K 15/02* (2006.01)
  *H04L 29/12* (2006.01)

(52) U.S. Cl.
  CPC .... *H04N 2201/0094* (2013.01); *Y02D 10/159* (2018.01); *Y02D 30/10* (2018.01)

(56) References Cited

U.S. PATENT DOCUMENTS

| | | | |
|---|---|---|---|
| 9,575,546 B2* | 2/2017 | Okazawa | G06F 1/3209 |
| 2002/0171743 A1* | 11/2002 | Kimizuka | H04N 1/00127 |
| | | | 348/222.1 |
| 2003/0076854 A1* | 4/2003 | Mudhar | H04L 12/185 |
| | | | 370/432 |
| 2009/0180415 A1* | 7/2009 | Park | H04L 67/327 |
| | | | 370/311 |
| 2009/0190600 A1* | 7/2009 | Akahane | H04L 12/66 |
| | | | 370/400 |
| 2009/0259868 A1* | 10/2009 | Katoh | G03G 15/5004 |
| | | | 713/324 |
| 2010/0235639 A1 | 9/2010 | Inoue | |
| 2010/0250987 A1* | 9/2010 | Furukawa | G06F 1/3203 |
| | | | 713/323 |
| 2011/0078464 A1* | 3/2011 | Yokomizo | G06F 1/3203 |
| | | | 713/300 |
| 2011/0235535 A1* | 9/2011 | Furukawa | G06F 1/3203 |
| | | | 370/252 |
| 2012/0272084 A1* | 10/2012 | Tsuji | G06F 8/665 |
| | | | 713/324 |

* cited by examiner

400 SETTING SCREEN

FIG. 5

- PROXY RESPONSE PATTERN
1 ARP Request TO INFORMATION PROCESSING APPARATUS
2 PREDETERMINED GetRequest OF SNMP

- WOL PATTERN
1 PACKET TO MAC ADDRESS OF INFORMATION PROCESSING APPARATUS
2 DEVICE SEARCH PACKET

- DISCARD PATTERN
SNMP PACKET

INFORMATION PROCESSING APPARATUS CONTROL METHOD OF INFORMATION PROCESSING APPARATUS AND STORAGE MEDIUM

CROSS-REFERENCE TO RELATED APPLICATIONS

This application is a Continuation, and claims the benefit, of U.S. patent application Ser. No. 14/097,824 filed Dec. 5, 2013 (now U.S. Pat No. 9,575,546), which claims the benefit of Japanese Patent Application No. 2012-267558 filed Dec. 6, 2012. Each of U.S. patent application Ser. No. 14/097,824 and Japanese Patent Application No. 2012-267558 is hereby incorporated by reference herein in its entirety.

BACKGROUND OF THE INVENTION

Field of the Invention

The present invention relates to an information processing apparatus, a control method of the information processing apparatus, and a storage medium.

Description of the Related Art

In recent years, there are growing demands for reducing power consumption of information processing apparatuses such as printers and digital multi functional peripherals (MFPs). In order to meet such demands, for example, there is developed a known technique that shifts an information processing apparatus from a normal power mode to a power saving mode if the apparatus does not operate for a predetermined period of time. In the normal power mode, power is supplied to both of a main control unit and a communication unit of the information processing apparatus. When the mode is changed to the power saving mode, however, although power is continuously supplied to the communication unit of the information processing apparatus, power to the main control unit of the information processing apparatus is blocked. Thus, the power consumption of the information processing apparatus in the power saving mode is reduced as a whole compared to when the apparatus is in the normal power mode. Japanese Patent Application Laid-Open No. 2006-259906 discusses a technique in which, if the information processing apparatus is in the normal power mode, the main control unit responds to a received packet sent from an external apparatus whereas, if the information processing apparatus is in the power saving mode, the communication unit responds to the received packet in place of the main control unit.

According to the above-described technique, the communication unit determines whether the received packet matches a response pattern stored in advance in the information processing apparatus. If the communication unit determines that the received packet matches the response pattern, the communication unit responds to the received packet. As the response pattern, for example, a status request, which is used for polling and output by an external apparatus to the information processing apparatus at regular intervals, is set in advance in the information processing apparatus. If such a status request used for polling is set in advance as the response pattern, since the communication unit responds to the status request in place of the main control unit, the information processing apparatus can maintain the power saving mode and the power consumption of the information processing apparatus as a whole can be reduced.

If the type of the external apparatus is changed or if a version of an application which operates on the external apparatus is upgraded, the type of the status request used for polling by the external apparatus at regular intervals may be added. In such a case, according to the above-described technique, the communication unit can respond only to the status request set in advance and not to the newly-added status request. Thus, on receiving the newly-added status request, the mode of the information processing apparatus is shifted from the power saving mode to the normal power mode. Accordingly, there is an issue that the benefit from the power saving mode (reducing power consumption) cannot be fully obtained.

This issue can be solved by adding the newly-added status request to the response pattern. However, in adding a new pattern to the response pattern, it is necessary to change the hardware of the communication unit. Changing the hardware of the communication unit leads to increase in cost. Further, since it is impractical to change all the hardware of the information processing apparatuses on the market, it is not desirable to add the newly-added status request to the response pattern.

SUMMARY OF THE INVENTION

The present invention is directed to an information processing apparatus which can maintain a power saving mode even if, for example, the number of types of status request in which an external apparatus performs polling at regular intervals is increased.

According to an aspect of the present invention, an information processing apparatus operable in a first power mode and a second power mode with smaller power consumption than the first power mode includes a receiving unit configured to receive a packet sent from an external apparatus, a storage unit configured to store, as information to be used by the information processing apparatus, operating in the second power mode, for determining processing for a received packet received by the receiving unit, a response pattern which indicates a pattern of a packet in which the information processing apparatus responds to the received packet while maintaining the second power mode, a shift pattern which indicates a packet in which the information processing apparatus is shifted from the second power mode to the first power mode, a discard pattern in which the information processing apparatus discards the received packet and maintains the second power mode, and a setting unit configured to set whether to use the discard pattern in order to determine the processing for the received packet based on a designation of a user, wherein, if the information processing apparatus operates in the second power mode and the discard pattern is set to be used by the setting unit, the information processing apparatus determines the processing for the received packet based on the response pattern, the shift pattern, and the discard pattern, and, if the information processing apparatus operates in the second power mode and the discard pattern is set not to be used by the setting unit, the information processing apparatus determines the processing for the received packet based on the response pattern and the shift pattern.

Further features of the present invention will become apparent from the following description of exemplary embodiments with reference to the attached drawings.

BRIEF DESCRIPTION OF THE DRAWINGS

FIG. 5 illustrates a proxy response pattern, a Wake On LAN (WOL) pattern, and a discard pattern according to a first exemplary embodiment of the present invention.

DESCRIPTION OF THE EMBODIMENTS

Various exemplary embodiments, features, and aspects of the invention will be described in detail below with reference to the drawings.

First, a first exemplary embodiment will be described.

Figure 1:
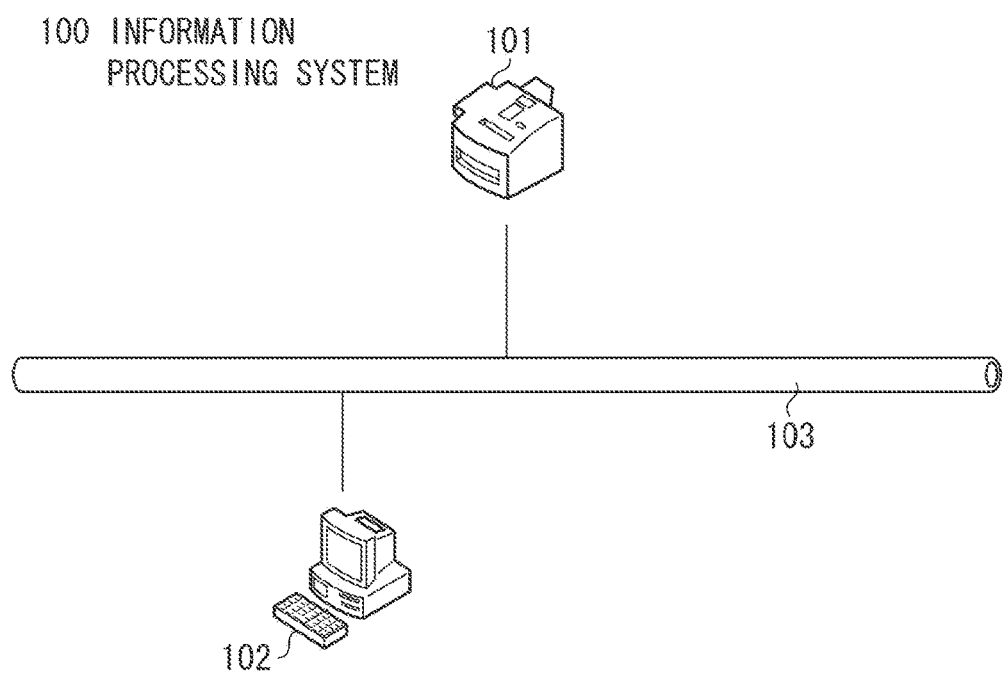
FIG. 1 illustrates an information processing system.

A configuration of an information processing system 100 according to the present exemplary embodiment will be described with reference to FIG. 1. The information processing system 100 includes an information processing apparatus 101 and a personal computer (PC) 102. The information processing apparatus 101 and the PC 102 are mutually connected via a network 103.

Figure 2:
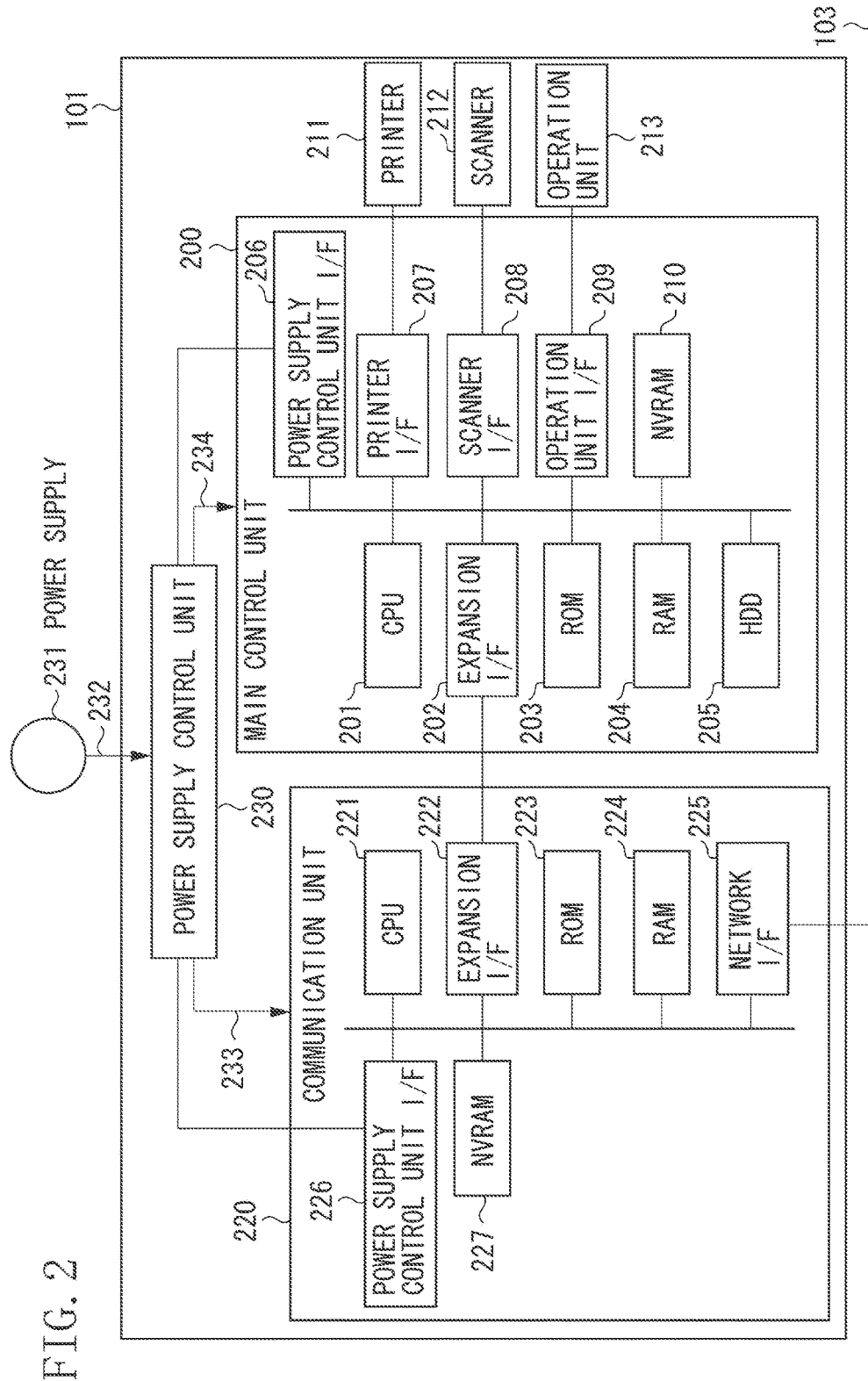
FIG. 2 illustrates a configuration of an information processing apparatus.

Next, a hardware configuration of the information processing apparatus 101 will be described with reference to FIG. 2. The information processing apparatus 101 is a digital MFP (printing apparatus) equipped with a copying function, a printing function, a scanning function, and a transmission function. Although the present exemplary embodiment is described using a digital MFP as the information processing apparatus 101, the information processing apparatus according to the present exemplary embodiment is not limited to a digital MFP. The information processing apparatus 101 does not necessarily include all of the above-described functions and can be an apparatus including at least one of the above-described functions, and may further include a different function.

The information processing apparatus 101 includes a main control unit 200, a communication unit 220, a power supply control unit 230, a printer 211, a scanner 212, and an operation unit 213. The configuration of each unit will be described.

The main control unit 200 includes a central processing unit (CPU) 201, an expansion interface (I/F) 202, a read-only memory (ROM) 203, a random access memory (RAM) 204, a hard disk drive (HDD) 205, a power supply control unit I/F 206, a printer I/F 207, a scanner I/F 208, an operation unit I/F 209, and a non-volatile random access memory (NVRAM) 210. The units are connected to be able to communicate with one another via a bus.

The CPU 201 reads a control program stored in the ROM 203 and controls the operation of the entire information processing apparatus 101. The RAM 204 is used as a main memory and a temporary storage area such as a work area of the CPU 201. The HDD 205 is a storage area used for storing various types of information such as font data, an emulation program, and form data. The NVRAM 210 is a non-volatile memory and stores various types of information. The expansion I/F 202 is used when the main control unit communicates with the communication unit 220. Although one CPU (the CPU 201) uses one memory (the RAM 204 or the HDD 205) in executing the processing of the flowcharts described below by the main control unit 200 of the information processing apparatus 101, the exemplary embodiment of the present invention is not limited to such an example. For example, a plurality of CPUs and a plurality of RAMs or HDDs may be configured to work together so that the processing of the flowcharts described below can be executed.

The printer I/F 207 connects the main control unit 200 and the printer 211. The printer 211 executes print processing based on a print job and image data generated by the scanner 212. The image data printed by the printer 211 is transferred from the main control unit 200 to the printer 211 via the printer I/F 207.

The scanner I/F 208 connects the main control unit 200 and the scanner 212. The scanner 212 reads a document and generates image data. The image data generated by the scanner 212 is transferred to the main control unit 200 via the scanner I/F 208.

The operation unit I/F 209 connects the main control unit 200 and the operation unit 213. The operation unit 213 includes a liquid crystal display unit having a touch panel function or a keyboard. Information input by a user via the operation unit 213 is transferred to the main control unit 200 via the operation unit I/F 209.

The power supply control unit I/F 206 connects the main control unit 200 to the power supply control unit 230. A shift instruction of the power mode described below is transferred from the main control unit 200 to the power supply control unit 230 via the power supply control unit I/F 206.

Next, the communication unit 220 will be described. The communication unit 220 includes a CPU 221, an expansion I/F 222, a ROM 223, a RAM 224, a network I/F 225, a power supply control unit I/F 226, and an NVRAM 227. The units are connected to be able to communicate with one another via a bus. The communication unit 220 is a network interface card (NIC) and can be removed from the information processing apparatus 101. The main control unit 200 can communicate with an external apparatus such as the PC 102 via the communication unit 220.

The CPU 221 reads a control program stored in the ROM 223 and controls the operation of the communication unit 220. The RAM 224 is used as a main memory and a temporary storage area such as a work area of the CPU 221. The NVRAM 227 is a non-volatile memory and stores various types of information. Although one CPU (the CPU 221) uses one memory (the RAM 224) in executing the processing of the flowcharts described below by the communication unit 220 of the information processing apparatus 101, the exemplary embodiment of the present invention is not limited to such an example. For example, a plurality of CPUs and a plurality of RAMs may be configured to work together so that the processing of the flowcharts described below can be executed.

The network I/F 225 is connected to the network 103 and performs transmission and reception of data between the communication unit 220 and an external apparatus such as the PC 102. The expansion I/F 222 communicates with the main control unit 200.

The power supply control unit I/F 226 connects the communication unit 220 to the power supply control unit 230. The shift instruction of the power mode described below is transferred from the communication unit 220 to the power supply control unit 230 via the power supply control unit I/F 226.

The power supply control unit 230 converts alternating current (AC) power supplied from a power supply 231 via a power supply line 232 to direct current (DC) power. Then, the power supply control unit 230 supplies the DC power to the communication unit 220 and the main control unit 200 via power supply lines 233 and 234. According to the present exemplary embodiment, the power supply control unit 230 supplies DC power to each of the printer 211, the scanner 212, and the operation unit 213 via power supply lines (not illustrated). The power supply control unit 230 controls the power mode of the information processing apparatus 101 based on the shift instruction received from the power supply control units I/F 206 and 226.

Next, the power mode of the information processing apparatus 101 will be described. The information processing apparatus 101 has two power modes: a normal power mode and a power saving mode.

When the information processing apparatus 101 operates in the normal power mode, power is supplied to both of the main control unit 200 and the communication unit 220 from the power supply control unit 230. In the normal power mode, power may be continuously supplied to the printer 211, the scanner 212, and the operation unit 213. However, if any of the printer 211, the scanner 212, and the operation unit 213 is not used, power to the unused unit may be blocked. In other words, the normal power mode is a power mode where power is supplied to at least both of the main control unit 200 and the communication unit 220 by the power supply control unit 230.

On the other hand, when the information processing apparatus 101 operates in the power saving mode, although power is supplied to the communication unit 220 by the power supply control unit 230, power to the main control unit 200, the printer 211, the scanner 212, and the operation unit 213 is blocked. Since the power to the main control unit 200, the printer 211, the scanner 212, and the operation unit 213 is blocked, the power saving mode is a mode with smaller power consumption compared to the normal power mode.

When the information processing apparatus 101 operates in the power saving mode, processing of a packet sent from an external apparatus such as the PC 102 is executed by the communication unit 220 in place of the main control unit 200. When the communication unit 220 executes the processing, the communication unit 220 determines the processing to be performed for the received packet based on a proxy response pattern, a Wake On LAN (WOL) pattern, and a discard pattern. The proxy response pattern, the WOL pattern, and the discard pattern will be described in detail below with reference to FIG. 5.

Figure 3:
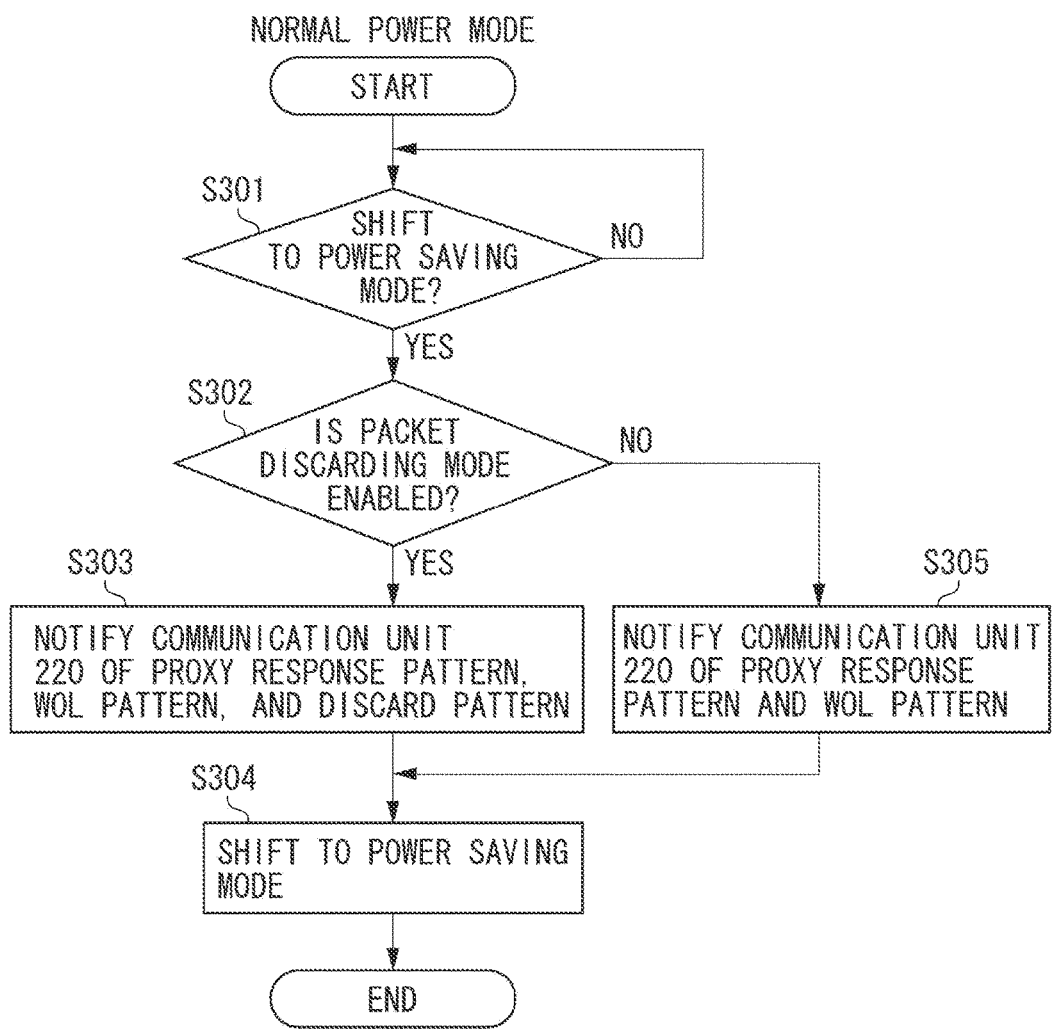
FIG. 3 is a flowchart illustrating processing which is executed when the information processing apparatus is shifted from a normal power mode to a power saving mode.

If the information processing apparatus 101, which is operating in the normal power mode, determines that a shift condition to the power saving mode is satisfied, the mode of the information processing apparatus is shifted to the power saving mode. This shift to the power saving mode will be described with reference to a flowchart in FIG. 3. Each step of the flowchart in FIG. 3 is processed by the CPU 201 of the main control unit 200 loading a program stored in a memory, such as the ROM 203, to the RAM 204 and executing it. The processing of the flowchart in FIG. 3 is processing which is executed when the information processing apparatus 101 operates in the normal power mode.

In step S301, the CPU 201 determines whether the normal power mode is to be shifted to the power saving mode. According to the present exemplary embodiment, if the CPU 201 determines that the shift condition to the power saving mode is satisfied, the CPU 201 determines that the normal power mode is to be shifted to the power saving mode (YES in step S301), and the processing proceeds to step S302. On the other hand, if the CPU 201 does not determine that the shift condition to the power saving mode is satisfied, the CPU 201 determines that the normal power mode is not to be shifted to the power saving mode (NO in step S301), and the processing in step S301 is repeated. Then, the CPU 201 waits until it determines the shift condition to the power saving mode is satisfied. According to the present exemplary embodiment, if a print job is not input in the information processing apparatus 101 for a predetermined period of time (e.g., 5 minutes) or if a shift instruction to the power saving mode is input by the user via the operation unit 213, the CPU 201 determines that the shift condition to the power saving mode is satisfied.

In step S302, the CPU 201 determines whether the setting of the packet discarding mode is enabled. If the setting of the packet discarding mode is enabled, the discard pattern, which is illustrated in FIG. 5 and described below, will be used when the communication unit 220 determines the processing of the received packet. On the other hand, if the setting of the packet discarding mode is disabled, the discard pattern illustrated in FIG. 5 and described below, will not be used when the communication unit 220 determines the processing of the received packet. By enabling the packet discarding mode, the communication unit 220 can discard a particular packet which matches the discard pattern when the information processing apparatus 101 is in the power saving mode.

Figure 4:
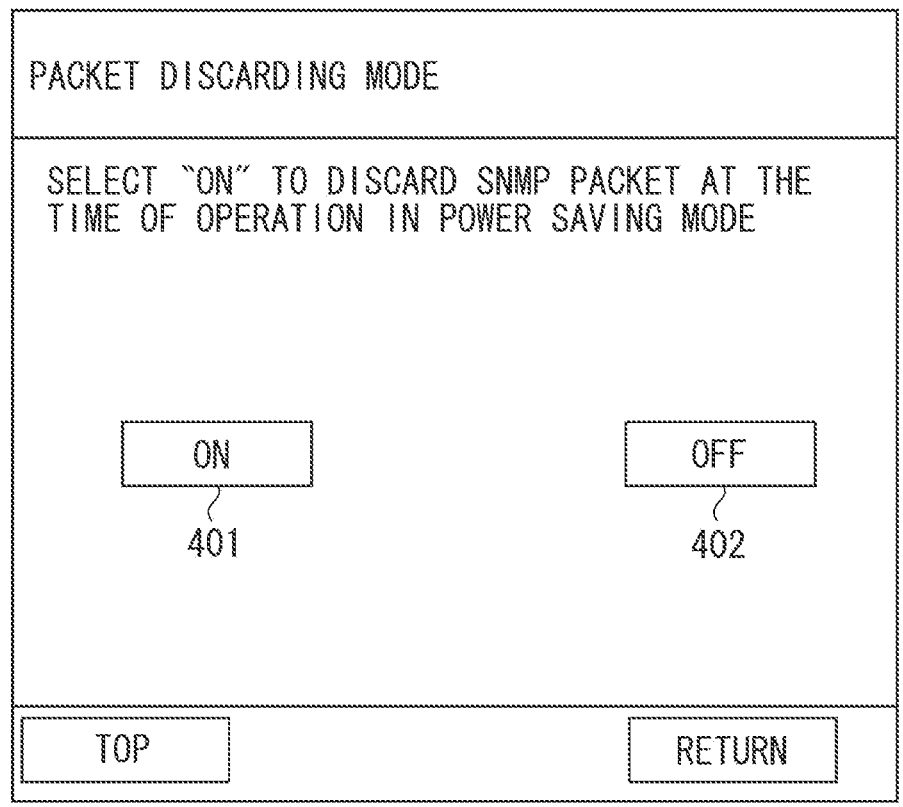
FIG. 4 is a setting screen for enabling/disabling setting of a packet discarding mode.

According to the present exemplary embodiment, whether to enable the packet discarding mode is selected by the user in advance. A setting screen 400 illustrated in FIG. 4 is used when the user determines whether to enable the packet discarding mode. The setting screen 400 is displayed on the operation unit 213. If the user selects an ON button 401, the packet discarding mode is enabled. On the other hand, if the user selects an OFF button 402, the packet discarding mode is disabled. Whether the packet discarding mode is enabled or disabled via the setting screen 400 is stored in the NVRAM 210 of the main control unit 200 and the NVRAM 227 of the communication unit 220.

Referring back again to the flowchart in FIG. 3, in step S302, if the setting of the packet discarding mode is enabled and the enabled setting is stored in the NVRAM 210 of the main control unit 200, the CPU 201 determines that the packet discarding mode is enabled (YES in step S302), and the processing proceeds to step S303. On the other hand, in step S302, if the setting of the packet discarding mode is disabled and the disabled setting is stored in the NVRAM 210 of the main control unit 200, the CPU 201 determines that the packet discarding mode is disabled (NO in step S302), and the processing proceeds to step S305.

In step S303, the CPU 201 notifies the communication unit 220 of the proxy response pattern, the WOL pattern, and the discard pattern stored in advance in the NVRAM 210 via the expansion I/F 202. Then, the communication unit 220 stores the proxy response pattern, the WOL pattern, and the discard pattern in the NVRAM 227.

FIG. 5 illustrates an example of the proxy response pattern, the WOL pattern, and the discard pattern according to the present exemplary embodiment. The proxy response pattern, the WOL pattern, and the discard pattern illustrated in FIG. 5 are stored in advance in the NVRAM 210 of the main control unit 200.

First, the proxy response pattern will be described. The proxy response pattern is a pattern of a packet that responds to the received packet. The communication unit 220 responds to the received packet in place of the main control unit 200. The response to the received packet made by the communication unit 220 in place of the main control unit 200 will be hereinafter referred to as a proxy response. According to this proxy response, the entire information processing apparatus 101 can respond to the received packet while maintaining the power saving state (i.e., power saving mode).

According to FIG. 5, two patterns are stored as the proxy response pattern. The first pattern is an "Address Resolution Protocol (ARP) Request to information processing apparatus" and the second pattern is a "predetermined GetRequest of a Simple Network Management Protocol (SNMP)". A GetRequest of SNMP is a request for the status of the information processing apparatus 101. The status which is to be specifically requested is designated by an object ID (OID) included in the GetRequest. According to the present exemplary embodiment, two types of GetRequests with OIDs of "hrDeviceDescr" and "hrDeviceErrors" are stored as the proxy response patterns.

The two types of GetRequests with OIDs of "hrDeviceDescr" and "hrDeviceErrors" are standard status requests used for polling output by the PC 102 to the information processing system 100 at regular intervals. Since the communication unit 220 performs the proxy response to the status requests used for polling output by an external apparatus such as the PC 102 at regular intervals, the information processing apparatus 101 can maintain the power saving mode.

Next, the WOL pattern will be described. The WOL pattern is a shift pattern which indicates that the information processing apparatus 101 needs to be shifted from the power saving mode to the normal power mode. If the received packet matches the WOL pattern, the communication unit 220 notifies the power supply control unit 230 of the shift instruction, by which the power saving mode is shifted to the normal power mode, via the power supply control unit I/F 226. Accordingly, the power supply control unit 230 shifts the mode of the information processing apparatus 101 from the power saving mode to the normal power mode. When the mode of the information processing apparatus 101 is shifted to the normal power mode, the received packet is transferred from the communication unit 220 to the main control unit 200, and the main control unit 200 performs processing of the received packet such as print processing based on a print job. According to FIG. 5, two patterns are stored as the WOL pattern. One is a "packet to media access control (MAC) address of information processing apparatus" and the other is a "device search packet".

Next, the discard pattern will be described. If the received packet matches the discard pattern, the communication unit 220 discards the received packet and maintains the power saving mode. According to FIG. 5, an "SNMP packet" is stored as the discard pattern.

The SNMP packet is used as the discard pattern since the number of types of the external apparatus such as the PC 102 may increase and the version of the application that runs on the PC 102 may be upgraded. In such cases, it is assumed that the type of the status requests used for polling at regular intervals for the information processing apparatus 101 is added. For example, a case will be described where the version of an application used by the PC 102 is upgraded and GetRequests with OIDs of "prtMarkerSuppliesLevel" and "prtInputCurrentLevel" are newly added as the status requests used for polling at regular intervals. Although described in detail with reference to a flowchart in FIG. 7 below, if the packet discarding mode is not enabled, the mode of the information processing apparatus 101 is shifted from the power saving mode to the normal power mode when the communication unit 220 receives the GetRequests with the OIDs of "prtMarkerSuppliesLevel" and "prtInputCurrentLevel". This is because the GetRequests with the OIDs of "prtMarkerSuppliesLevel" and "prtInputCurrentLevel" match the WOL pattern of a "packet to MAC address of information processing apparatus". Thus, according to the present exemplary embodiment, if the packet discarding mode is enabled, the information processing apparatus 101 can maintain the power saving mode by the communication unit 220 discarding the newly-added GetRequest.

Further, according to the present exemplary embodiment, the user selects whether to enable or disable the packet discarding mode via the setting screen 400. Regarding the above-described newly-added status request, the power saving mode may be maintained by the communication unit 220 discarding the status request without exception. However, it may be necessary for the information processing apparatus 101 to respond to a newly-added status request depending on the specification of the application which operates on the PC 102. Thus, it is not always desirable to have the communication unit 220 discard all the newly-added status requests. In other words, it is desirable to enable the user to select whether to enable or disable the packet discarding mode considering the environment of the entire information processing system 100.

Referring back again to the flowchart in FIG. 3, if the packet discarding mode is enabled on the setting screen 400, in step S303, the CPU 201 notifies the communication unit 220 of the proxy response pattern, the WOL pattern, and the discard pattern via the expansion I/F 202. In step S304, the CPU 201 shifts the information processing apparatus 101 from the normal power mode to the power saving mode. In other words, the CPU 201 sends a shift instruction to the power supply control unit 230 via the power supply control unit I/F 206 so that the normal power mode is shifted to the power saving mode. Then, the mode of the information processing apparatus 101 is shifted from the normal power mode to the power saving mode by the power supply control unit 230.

On the other hand, if the packet discarding mode is disabled on the setting screen 400, in step S305, the CPU 201 notifies the communication unit 220 of the proxy response pattern and the WOL pattern, which have been stored in advance in the NVRAM 210, via the expansion I/F 202. Then, the communication unit 220 stores the notified proxy response pattern and the notified WOL pattern in the NVRAM 227. Unlike in step S303, the communication unit 220 is not notified of the discard pattern in step S305. This is because the packet discarding mode is set disabled on the setting screen 400. In step S305, when the CPU 201 notifies the communication unit 220 of the proxy response pattern and the WOL pattern, the processing proceeds to step S304. In step S304, the CPU 201 shifts the information processing apparatus 101 from the normal power mode to the power saving mode.

According to the flowchart in FIG. 3, whether the communication unit 220 is notified the discard pattern is depending on the determination result in step S302. However, the present exemplary embodiment is not limited to such a configuration. For example, without performing the determination in step S302 and regardless of whether the packet discarding mode is enabled, the CPU 201 can notify the communication unit 220 of the proxy response pattern, the WOL pattern, and the discard pattern.

Figure 6:
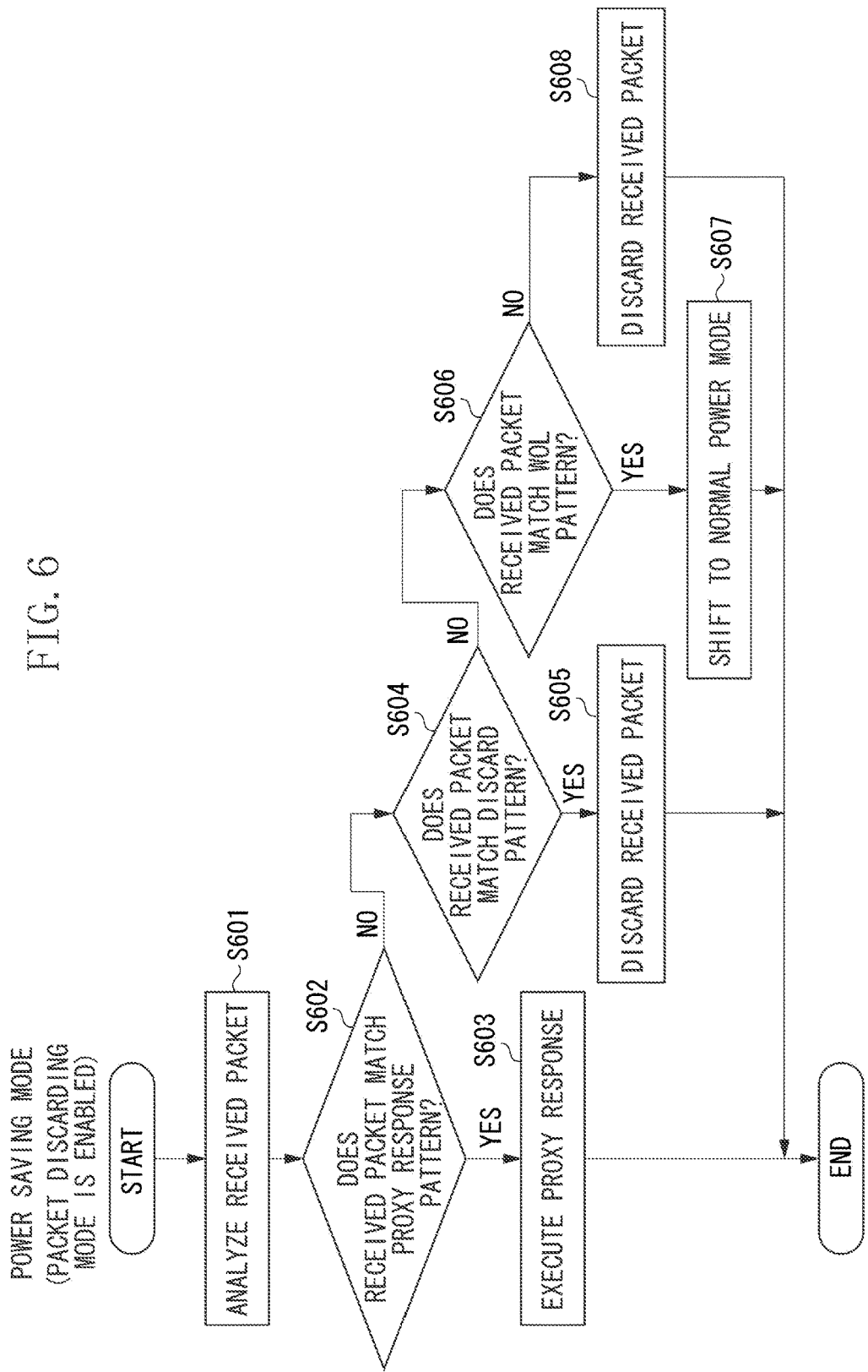
FIG. 6 is a flowchart illustrating processing which is executed when the information processing apparatus is in the power saving mode according to the first exemplary embodiment.

Next, processing which is executed when the setting of the packet discarding mode is enabled on the setting screen 400 and, further, the information processing apparatus 101 operates in the power saving mode will be described with reference to a flowchart in FIG. 6. The processing in the flowchart in FIG. 6 is executed when the communication unit 220 receives a packet sent from an external apparatus. Further, each step in the flowchart in FIG. 6 is processed by the CPU 221 of the communication unit 220 loading a program stored in a memory such as the ROM 223 to the RAM 224 and executing it.

When the communication unit 220 receives a packet sent from an external apparatus such as the PC 102, in step S601, the CPU 221 analyzes the received packet. In step S602, the CPU 221 determines whether the received packet matches the proxy response pattern illustrated in FIG. 5.

In step S602, if the CPU 221 determines that the received packet matches the proxy response pattern (YES in step S602), the processing proceeds to step S603. In step S603, the CPU 221 executes the proxy response while maintaining the power saving mode. On the other hand, in step S602, if the CPU 221 determines that the received packet does not match the proxy response pattern (NO in step S602), the processing proceeds to step S604.

In step S604, the CPU 221 determines whether the received packet matches the discard pattern illustrated in FIG. 5. In step S604, if the CPU 221 determines that the received packet matches the discard pattern (YES in step S604), the processing proceeds to step S605. In step S605, the CPU 221 discards the received packet and maintains the power saving mode. If the packet discarding mode is enabled, since the above-described newly-added GetRequests with the OIDs of "prtMarkerSuppliesLevel" and "prtInputCurrentLevel" are discarded in step S605, the information processing apparatus 101 can maintain the power saving mode.

In step S604, if the CPU 221 determines that the received packet does not match the discard pattern (NO in step S604), the processing proceeds to step S606. In step S606, the CPU 221 determines whether the received packet matches the WOL pattern illustrated in FIG. 5.

In step S606, if the CPU 221 determines that the received packet matches the WOL pattern illustrated in FIG. 5 (YES in step S606), the processing proceeds to step S607. In step S607, the CPU 221 controls the power supply control unit 230 so that the power saving mode of the information processing apparatus 101 is shifted to the normal power mode. To be more precise, a shift instruction, by which the mode is shifted to the normal power mode, is notified to the power supply control unit 230 via the power supply control unit I/F 226, and the power saving mode of the information processing apparatus 101 is shifted to the normal power mode by the power supply control unit 230. When the mode of the information processing apparatus 101 is shifted to the normal power mode, the received packet is transferred to the main control unit 200 via the expansion I/F 222, and the processing of the received packet is executed by the main control unit 200.

On the other hand, in step S606, if the CPU 221 determines that the received packet does not match the WOL pattern (NO in step S606), the processing proceeds to step S608. In step S608, the CPU 221 discards the received packet, and the power saving mode is maintained.

According to the flowchart illustrated in FIG. 6, if the setting of the packet discarding mode is enabled and, further, the information processing apparatus 101 operates in the power saving mode, the communication unit 220 determines the processing to be executed for the received packet based on the proxy response pattern, the WOL pattern, and the discard pattern.

Figure 7:
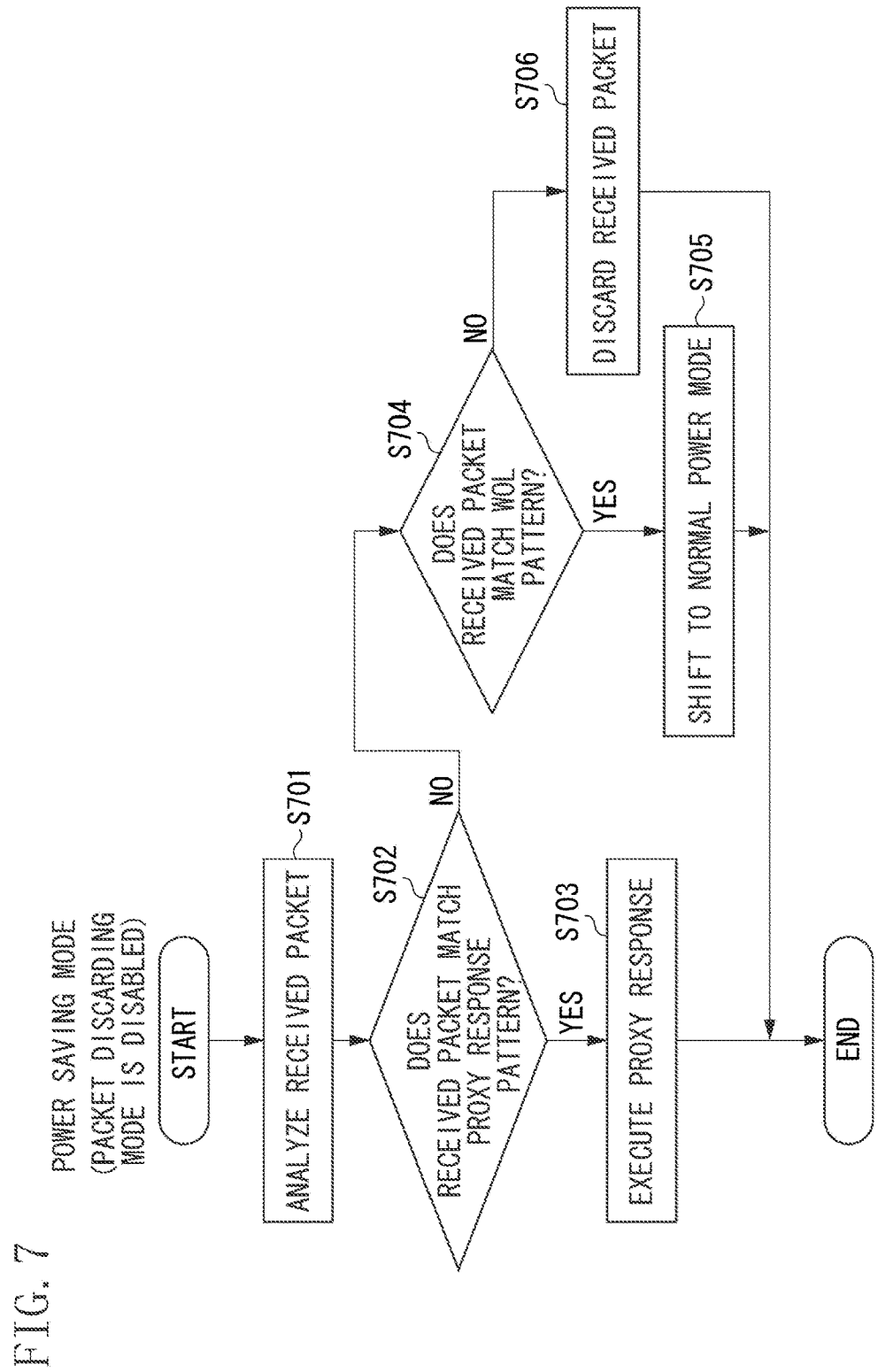
FIG. 7 is a flowchart illustrating processing which is executed when the information processing apparatus is in the power saving mode according to the first exemplary embodiment.

Next, processing which is executed when the setting of the packet discarding mode is disabled on the setting screen 400 and, further, the information processing apparatus 101 operates in the power saving mode will be described with reference to a flowchart in FIG. 7. The processing in the flowchart in FIG. 7 is executed when the communication unit 220 receives a packet sent from an external apparatus. Further, each step in the flowchart in FIG. 7 is processed by the CPU 221 of the communication unit 220 loading a program stored in a memory such as the ROM 223 to the RAM 224 and executing it. The difference between the flowchart in FIG. 6 and the flowchart in FIG. 7 is whether the packet discarding mode is enabled or not, in other words, whether the communication unit 220 uses the discard pattern when it determines the processing of the received packet.

When the communication unit 220 receives a packet sent from an external apparatus such as the PC 102, in step S701, the CPU 221 analyzes the received packet. In step S702, the CPU 221 determines whether the received packet matches the proxy response pattern illustrated in FIG. 5.

In step S702, if the CPU 221 determines that the received packet matches the proxy response pattern (YES in step S702), the processing proceeds to step S703. In step S703, the CPU 221 executes the proxy response while maintaining the power saving mode. On the other hand, in step S702, if the CPU 221 determines that the received packet does not match the proxy response pattern (NO in step S702), the processing proceeds to step S704.

In step S704, the CPU 221 determines whether the received packet matches the WOL pattern illustrated in FIG. 5. In step S704, if the CPU 221 determines that the received packet matches the WOL pattern illustrated in FIG. 5 (YES in step S704), the processing proceeds to step S705. In step S705, the CPU 221 controls the power supply control unit 230 so that the power saving mode of the information processing apparatus 101 is shifted to the normal power mode.

Steps S704 and S705 are similar to steps S606 and S607 in FIG. 6 except for the processing which is performed when the above-described newly-added GetRequests with the OIDs of "prtMarkerSuppliesLevel" and "prtInputCurrentLevel" are received. In such a case, if the packet discarding mode is enabled as is in FIG. 6, the newly-added GetRequests will be discarded. On the other hand, if the packet discarding mode is disabled as is in FIG. 7, the newly-added GetRequests will be determined to be match the WOL pattern in step S704. Then, in step S705, the power saving mode is shifted to the normal power mode. After the information processing apparatus 101 is shifted to the normal power mode, the main control unit 200 responds to the newly-added GetRequests.

In step S704, if the CPU 221 determines that the received packet does not match the WOL pattern illustrated in FIG. 5 (NO in step S704), the processing proceeds to step S706. In step S706, the CPU 221 discards the received packet and maintains the power saving mode.

According to the flowchart illustrated in FIG. 7, if the setting of the packet discarding mode is disabled and, further, the information processing apparatus 101 operates in the power saving mode, the communication unit 220 determines the processing to be executed for the received packet based on the proxy response pattern and the WOL pattern without using the discard pattern.

As described above, according to the present exemplary embodiment, the communication unit 220 sets the discard pattern used for the discarding of the received packet. Further, whether the discard pattern can be used by the communication unit 220 can be changed according to the designation by the user.

Since the user can select whether to enable the packet discarding mode according to the environment of the information processing system 100, the convenience of the user is enhanced. For example, if the above-described newly-added GetRequests with the OIDs of "prtMarkerSuppliesLevel" and "prtInputCurrentLevel" are frequently transmitted from the PC 102 to the information processing apparatus 101 and, further, if it is necessary for the information processing apparatus 101 to respond to such GetRequests, it is desirable for the user to set the packet discarding mode disabled. If the packet discarding mode is set disabled, since the power saving mode will be shifted to the normal power mode when the newly-added GetRequest is received by the communication unit 220, the information processing apparatus 101 can respond to the received GetRequest.

On the other hand, even if the newly-added GetRequests are frequently transmitted from the PC 102 to the information processing apparatus 101, if it is not necessary for the information processing apparatus 101 to respond to such GetRequests, it is desirable for the user to set the packet discarding mode enabled. If the packet discarding mode is set enabled, since the communication unit 220 discards the newly-added GetRequest, the information processing apparatus 101 can maintain the power saving mode and the power consumption can be reduced.

Further, according to the present exemplary embodiment, although the communication unit 220 is notified of the proxy response pattern, the WOL pattern, and the discard pattern are notified when the mode is shifted to the power saving mode, the patterns may be notified at different timing. For example, the communication unit 220 is notified of the proxy response pattern, the WOL pattern, and the discard pattern can be notified when the information processing apparatus 101 is started.

Further, the user may add a new pattern to the proxy response pattern, the WOL pattern, and the discard pattern, or delete an existing pattern via an editing screen (not illustrated). For example, as for the discard pattern, although an SNMP packet is designated as the discard pattern in FIG. 5 as a particular protocol, packets of other protocols may be added to the discard pattern.

Next, a second exemplary embodiment will be described.

According to the first exemplary embodiment, it is determined whether the communication unit 220 uses the discard pattern when it determines the processing to be performed for the received packet according to whether the packet discarding mode is set enabled or disabled. According to the second exemplary embodiment, as a modification of the first exemplary embodiment, the communication unit 220 uses the discard pattern regardless of whether the packet discarding mode is set enabled or disabled.

Figure 8:
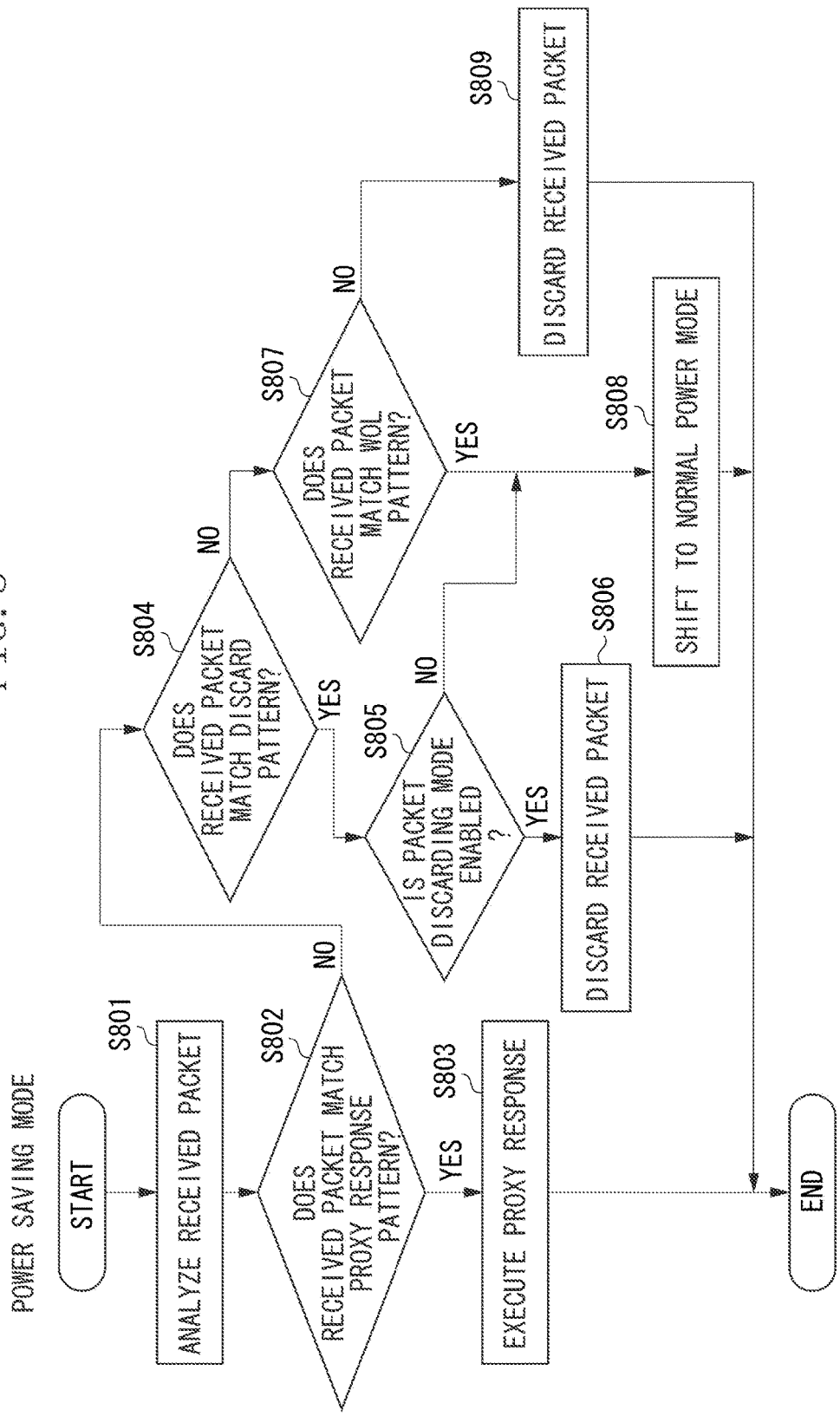
FIG. 8 is a flowchart illustrating processing which is executed when the information processing apparatus is in the power saving mode according to a second exemplary embodiment of the present invention.

Next, processing which is executed when the information processing apparatus 101 operates in the power saving mode will be described with reference to a flowchart in FIG. 8. The processing in the flowchart in FIG. 8 is executed when the communication unit 220 receives a packet sent from an external apparatus. Further, each step in the flowchart in FIG. 8 is processed by the CPU 221 of the communication unit 220 loading a program stored in a memory such as the ROM 223 to the RAM 224 and executing it. Unlike the first exemplary embodiment, if the information processing apparatus 101 operates in the power saving mode, the processing of the flowchart in FIG. 8 will be executed regardless of whether the packet discarding mode is set enabled or disabled on the setting screen 400.

When the communication unit 220 receives a packet sent from an external apparatus such as the PC 102, in step S801, the CPU 221 analyzes the received packet. In step S802, the CPU 221 determines whether the received packet matches the proxy response pattern illustrated in FIG. 5.

In step S802, if the CPU 221 determines that the received packet matches the proxy response pattern (YES in step S802), the processing proceeds to step S803. In step S803, the CPU 221 executes the proxy response while maintaining the power saving mode. On the other hand, in step S802, if the CPU 221 determines that the received packet does not match the proxy response pattern (NO in step S802), the processing proceeds to step S804.

In step S804, the CPU 221 determines whether the received packet matches the discard pattern illustrated in FIG. 5. In step S804, if the CPU 221 determines that the received packet matches the discard pattern (YES in step S804), the processing proceeds to step S805. On the other hand, in step S804, if the CPU 221 determines that the received packet does not match the discard pattern (NO in step S804), the processing proceeds to step S807.

In step S805, the CPU 221 determines whether the packet discarding mode is set enabled. If the packet discarding mode is set enabled in the NVRAM 227 of the communication unit 220 (YES in step S805), the CPU 221 determines that the packet discarding mode is set enabled, and the processing proceeds to step S806. In step S806, the CPU 221 discards the received packet. On the other hand, if the setting of the packet discarding mode is set disabled and the disabled setting is stored in the NVRAM 227 of the communication unit 220 (NO in step S805), in step S805, the CPU 221 determines that the packet discarding mode is not set enabled, and the processing proceeds to step S808.

According to the processing in steps S804 and S805, when the received packet matches the discard pattern, whether the communication unit 220 discards the received packet is changed depending on whether the packet discarding mode is set enabled or disabled by the user. If the received packet matches the discard pattern, the communication unit 220 discards the received packet on condition that the packet discarding mode is set enabled. On the other hand, even if the received packet matches the discard pattern, the communication unit 220 does not discard the received packet on condition that the packet discarding mode is set disabled by the user.

Referring back again to the flowchart in FIG. 8, in step S807, the CPU 221 determines whether the received packet matches the WOL pattern illustrated in FIG. 5. If the CPU 221 determines that the received packet matches the WOL pattern illustrated in FIG. 5 (YES in step S807), the processing proceeds to step S808. In step S808, the CPU 221 controls the power supply control unit 230 so that the power saving mode of the information processing apparatus 101 is shifted to the normal power mode. To be more precise, the power supply control unit 230 is notified of a shift instruction, by which the mode is shifted to the normal power mode, via the power supply control unit I/F 226, and the power saving mode of the information processing apparatus 101 is shifted to the normal power mode by the power supply control unit 230. When the mode of the information processing apparatus 101 is shifted to the normal power mode, the received packet is transferred to the main control unit 200 via the expansion I/F 222, and the processing of the received packet is executed by the main control unit 200.

In step S807, if the CPU 221 determines that the received packet does not match the WOL pattern illustrated in FIG. 5 (NO in step S807), the processing proceeds to step S809. In step S809, the CPU 221 discards the received packet, and the power saving mode is maintained.

The modification of the first exemplary embodiment has been described as the second exemplary embodiment. According to the present exemplary embodiment, the communication unit 220 uses a discard pattern for discarding the received packet and the user can select whether to enable or disable the packet discarding mode. Thus, according to the present exemplary embodiment, an effect similar to that of the first exemplary embodiment can be obtained.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A processing method executed by a printing apparatus in a case where the printing apparatus operating in a power saving mode receives a packet, the processing method comprising:
    determining whether the received packet satisfies a response condition that indicates a packet to which the printing apparatus is capable of responding while maintaining the power saving mode;
    responding to the received packet while maintaining the power saving mode, in a case where the received packet is determined to satisfy the response condition;
    determining whether the received packet satisfies a discard condition that indicates a packet needs to be discarded in the power saving mode, in a case where the received packet is determined not to satisfy the response condition;
    discarding the received packet while maintaining the power saving mode, in a case where the received packet is determined to satisfy the discard condition;
    determining whether the received packet satisfies a shift condition that indicates a packet for which the printing apparatus needs to be shifted from the power saving mode to a normal power mode, in a case where the received packet is determined not to satisfy the discard condition; and
    shifting the printing apparatus from the power saving mode to the normal power mode, in a case where the received packet is determined to satisfy the shift condition,
    wherein the received packet is determined to satisfy the response condition, at least in a case where the received packet is a GetRequest of a Simple Network Management Protocol (SNMP) in which a particular object ID is designated.

2. The processing method according to claim 1, further comprising
    discarding the received packet while maintaining the power saving mode, in a case where the received packet is determined not to satisfy the shift condition.

3. The processing method according to claim 1,
    wherein the received packet is determined to satisfy the discard condition, at least in a case where the received packet is a SNMP packet excluding at least the GetRequest of the SNMP in which the particular object ID is designated.

4. The processing method according to claim 1,
    wherein the received packet is determined to satisfy the discard condition, at least in a case where the received packet is a SNMP packet other than the GetRequest in which the particular object ID is designated.

5. The processing method according to claim 4,
    wherein the received packet is determined to satisfy the shift condition, at least in a case where a destination of the received packet is the printing apparatus.

6. The processing method according to claim 4,
    wherein the received packet is determined to satisfy the shift condition, at least in a case where a MAC address of a destination of the received packet matches a MAC address of the printing apparatus.

7. The processing method according to claim 1,
    wherein it is set on a basis of a user instruction whether or not to enable discard setting that indicates that, among the packets received by the printing apparatus operating in the power saving mode, packets satisfying the discard condition be discarded;
    in a case where the discard setting is enabled, performing:
        determining whether the received packet satisfies the response condition;
        responding to the received packet while maintaining the power saving mode, in a case where the received packet is determined to satisfy the response condition;
        determining whether the received packet satisfies the discard condition, in a case where the received packet is determined not to satisfy the response condition;
        discarding the received packet while maintaining the power saving mode, in a case where the received packet is determined to satisfy the discard condition;
        determining whether the received packet satisfies the shift condition, in a case where the received packet is determined not to satisfy the discard condition; and
        shifting the printing apparatus from the power saving mode to the normal power mode, in a case where the received packet is determined to satisfy the shift condition; and in a case where the discard setting is not enabled, performing:
  determining whether the received packet satisfies the response condition;
  responding to the received packet while maintaining the power saving mode, in a case where the received packet is determined to satisfy the response condition;
  determining whether the received packet satisfies the shift condition, in a case where the received packet is determined not to satisfy the response condition; and
  shifting the printing apparatus from the power saving mode to the normal power mode, in a case where the received packet is determined to satisfy the shift condition.

8. A printing apparatus comprising:
a first determination unit configured to determine whether a packet received by the printing apparatus operating in a power saving mode satisfies a response condition that indicates a packet to which the printing apparatus is capable of responding while maintaining the power saving mode;
a first processing unit configured to respond to the received packet while maintaining the power saving mode, in a case where the received packet is determined to satisfy the response condition by the first determination unit;
a second determination unit configured to determine whether the received packet satisfies a discard condition that indicates a packet needs to be discarded in the power saving mode, in a case where the received packet is determined not to satisfy the response condition by the first determination unit;
a second processing unit configured to discard the received packet while maintaining the power saving mode, in a case where the received packet is determined to satisfy the discard condition by the second determination unit;
a third determination unit configured to determine whether the received packet satisfies a shift condition that indicates a packet for which the printing apparatus needs to be shifted from the power saving mode to a normal power mode, in a case where the received packet is determined not to satisfy the discard condition by the second determination unit; and
a third processing unit configured to shift the printing apparatus from the power saving mode to the normal power mode, in a case where the received packet is determined to satisfy the shift condition by the third determination unit,
wherein the first determination unit determines the received packet to satisfy the response condition, at least in a case where the received packet is a GetRequest of a Simple Network Management Protocol (SNMP) in which a particular object ID is designated.

9. The printing apparatus according to claim 8,
wherein the third processing unit discards the received packet while maintaining the power saving mode, in a case where the received packet is determined not to satisfy the shift condition by the third determination unit.

10. The printing apparatus according to claim 8,
wherein the second determination unit determines the received packet to satisfy the discard condition, at least in a case where the received packet is a SNMP packet excluding at least the GetRequest of the SNMP in which the particular object ID is designated.

11. The processing method according to claim 8,
wherein the second determination unit determines the received packet to satisfy the discard condition, in a case where the received packet is a SNMP packet other than the GetRequest in which the particular object ID is designated.

12. The printing apparatus according to claim 11,
wherein the third determination unit determines the received packet to satisfy the shift condition, in a case where a destination of the received packet is the printing apparatus.

13. The printing apparatus according to claim 11,
wherein the third determination unit determines the received packet to satisfy the shift condition, in a case where a MAC address of a destination of the received packet matches a MAC address of the printing apparatus.

* * * * *